United States Patent [19]

Andersson et al.

[11] Patent Number: 5,499,516
[45] Date of Patent: Mar. 19, 1996

[54] ABSORBER FOR AN ABSORPTION REFRIGERATING APPARATUS

[75] Inventors: Sven-Erik Andersson, Trosa; Johnny S. Kornelind, Tyresö, both of Sweden

[73] Assignee: Aktiebolaget Electrolux, Stockholm, Sweden

[21] Appl. No.: 234,286

[22] Filed: Apr. 28, 1994

[30] Foreign Application Priority Data

May 14, 1993 [SE] Sweden .................. 9301671-5

[51] Int. Cl.⁶ .................. F25B 37/00; F28D 7/02
[52] U.S. Cl. .................. 62/494; 62/487; 62/484
[58] Field of Search .................. 62/476, 484, 490, 62/494, 487

[56] References Cited

U.S. PATENT DOCUMENTS

| | | | |
|---|---|---|---|
| 3,681,938 | 8/1972 | Blomberg et al. | 62/490 |
| 3,782,134 | 1/1974 | Meess et al. | 62/476 |
| 4,127,009 | 11/1978 | Phillips | 62/101 |
| 4,193,268 | 3/1980 | Phillips | 62/101 |
| 4,578,961 | 4/1986 | Domnick | 62/494 |
| 5,325,684 | 7/1994 | Stierlin et al. | 62/487 |

FOREIGN PATENT DOCUMENTS

| | | | |
|---|---|---|---|
| 610552 | 3/1935 | Germany. | |
| 47703 | 3/1977 | Japan | 62/476 |

*Primary Examiner*—Henry A. Bennet
*Assistant Examiner*—William C. Doerrler
*Attorney, Agent, or Firm*—Pearne, Gordon, McCoy & Granger

[57] ABSTRACT

An absorber (10) of an absorption refrigerating apparatus is constituted by two joined plates (52 and 54, respectively), which between themselves form a plurality of horizontal ducts (60) located above each other for the refrigerant. The bottom of the ducts shows small openings (64), through which the absorption liquid leaks down into the roof of ducts located below and moves downwards along their roofs and walls.

5 Claims, 2 Drawing Sheets

ABSORBER FOR AN ABSORPTION REFRIGERATING APPARATUS

BACKGROUND OF THE INVENTION

The invention refers to an absorber for an absorption refrigerating apparatus, which absorber shows an inlet for a liquid, flowing downwards through the absorber and absorbing a refrigerant, which in gaseous form flows through the absorber, the absorber being .constituted by two joined plates, which between themselves form a plurality of substantially horizontal ducts, arranged above each other, for the refrigerant Such an absorber having two joined plates is disclosed in U.S. Pat. No. 3,782,134. By the absorber having two joined plates it becomes easy to produce and occupies a small amount of space.

The object of the invention is to bring about an absorber of the kind introductorily set forth, where the absorption of refrigerant in the liquid is improved.

SUMMARY OF THE INVENTION

This object is obtained by the absorber according to the invention in that the plates on the inside of the absorber are treated in a way which promotes wetting of the inside by the liquid and that the bottom of the ducts have small openings, through which the liquid leaks down into the roof of a duct located below and moves downwards along its roof and walls.

By this the liquid will constantly move along the whole inner surface of the absorber, whereby the refrigerant during its passage through the absorber will permanently be surrounded by flowing, absorbing liquid.

BRIEF DESCRIPTION OF THE DRAWINGS

An embodiment of an absorber according to the invention is described below in connection with the enclosed drawing, in which.

DETAILED DESCRIPTION OF PREFERRED EMBODIMENTS

Figure 1:
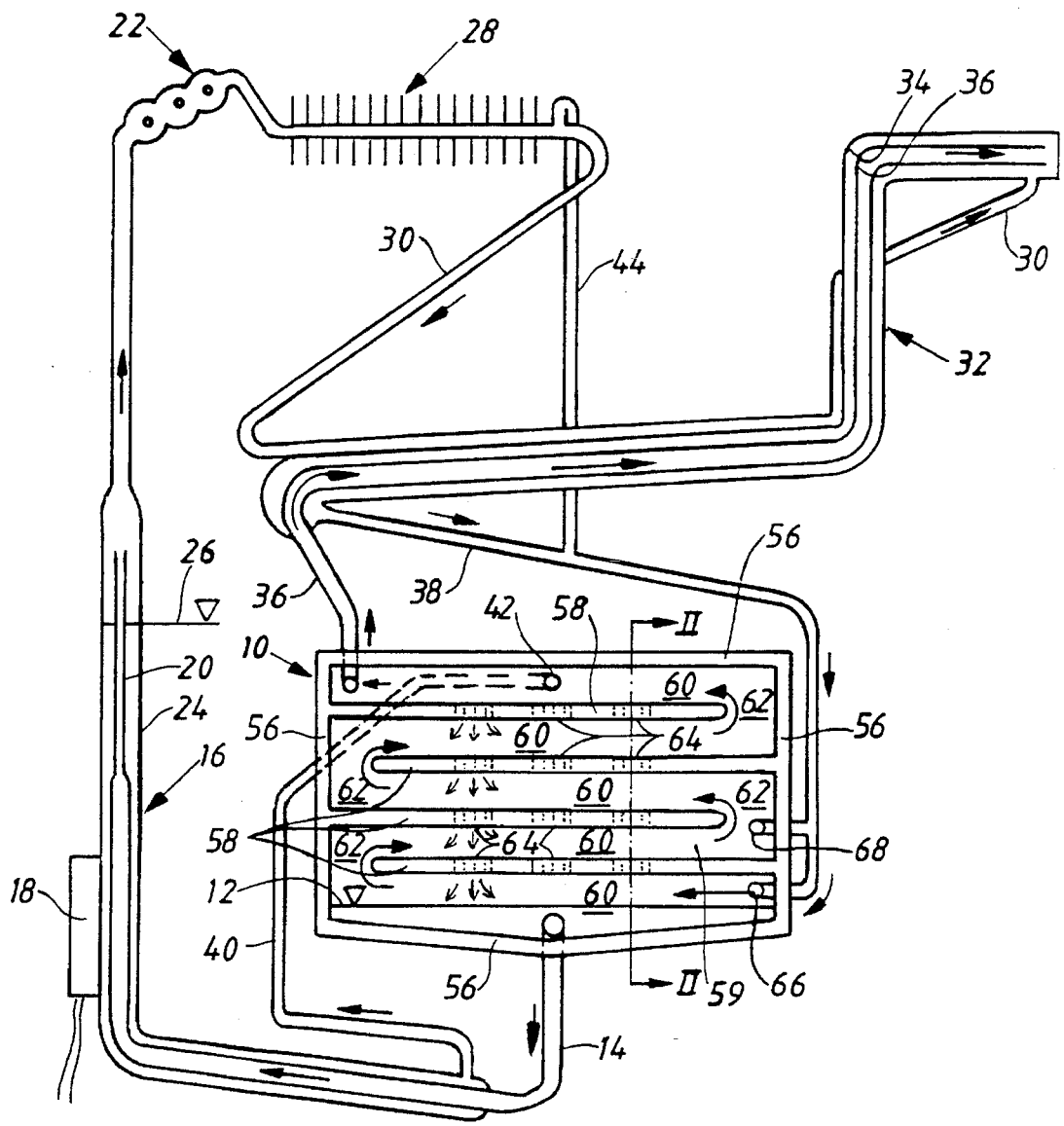
FIG. 1 shows the absorber as part of an absorption refrigerating apparatus.
Figure 2:
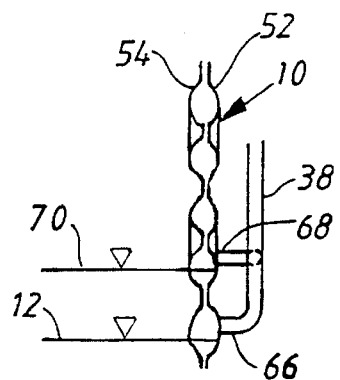
FIG. 2 shows a sectional view according to the marking II—II in FIG. 1.
Figure 3:
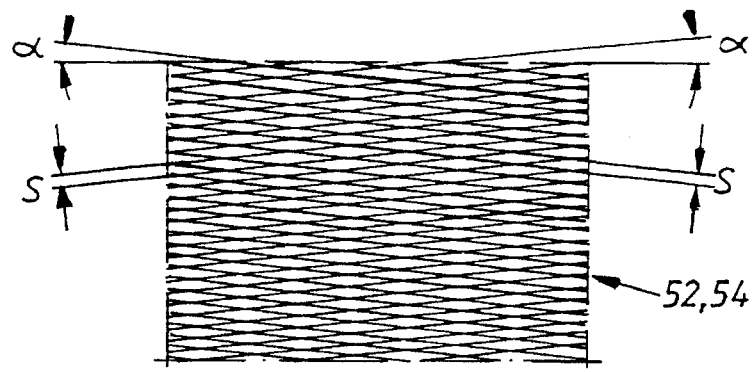
FIG. 3 shows a pattern of capillary grooves on the inside of the absorber.
Figure 4:
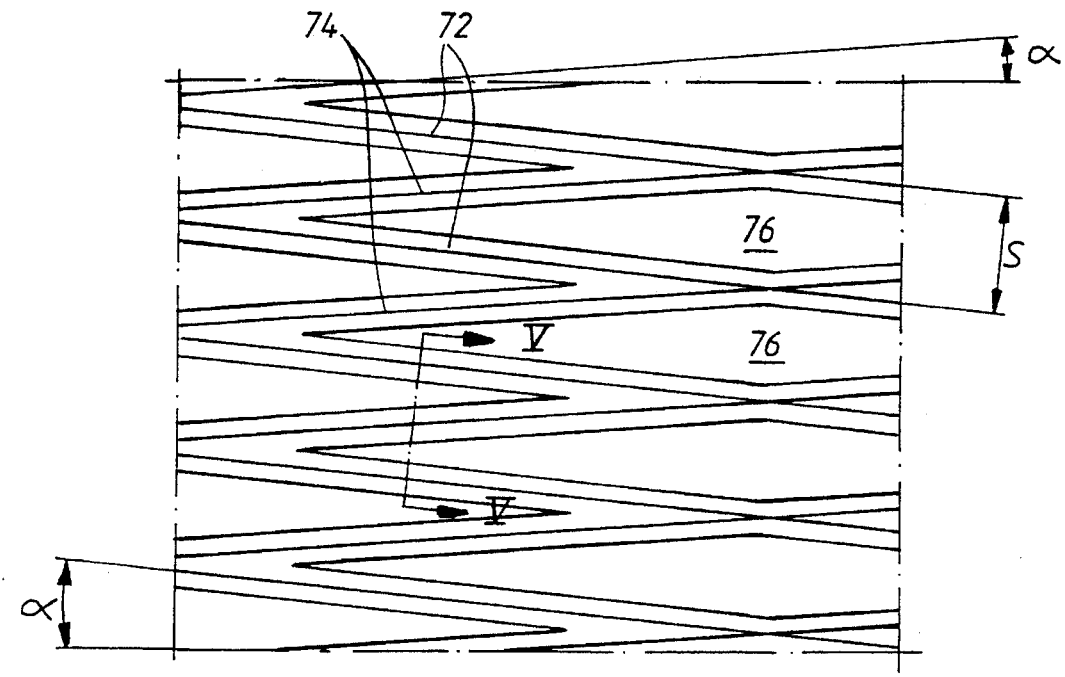
FIG. 4 shows an enlarged view of the pattern in FIG. 3.
Figure 5:
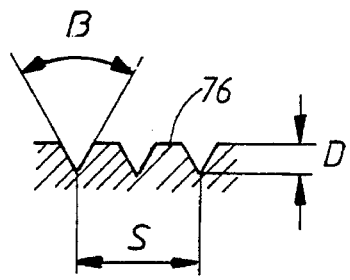
FIG. 5 shows a sectional view according to the marking V—V in FIG. 4.

FIG. 1 shows an absorption refrigerating apparatus for e.g. a refrigerator cabinet, e.g. according to FIG. 1 of U.S. Pat. No. 5,001,904, which apparatus shows an absorber 10 containing an absorption liquid, e.g. water, up to a level 12, in which liquid a refrigerant, e.g ammonia, is dissolved. This solution, which is relatively rich in refrigerant, is called a rich solution. The rich solution exits from the absorber 10 through a conduit 14 and enters a boiler 16, in which the rich solution is supplied with heat from an electric heating cartridge 18. Refrigerant vapor boils off from the rich solution which thereby becomes a so-called weak solution. The mixture of refrigerant vapor and weak solution is expelled through a pump pipe 20, the refrigerant vapor continuing to a separator 22 which separates out absorption liquid accompanying the refrigerant vapor, and the weak solution being collected in an outer pipe 24 of the boiler 16 to a certain level 26.

The refrigerant vapor flows from the separator 22 to a condenser 28, where heat is transferred from the vapor to surrounding air so that the vapor condenses. The refrigerant condensate leaves the condenser through a conduit 30 and enters the evaporator 32, where the condensate meets a flow of an inert gas, e.g. hydrogen gas, and is vaporized in an outer pipe 34 in the inert gas during absorption of heat from the goods in the refrigerator cabinet. The inert gas is supplied to the evaporator 32 through an inner pipe 36 which is located within the outer pipe 34 and the mixture of inert gas and vaporized refrigerant exits from the evaporator 32 through the pipe 34 and continues via a pipe 38 to the absorber 10.

The mixture of refrigerant vapor and inert gas rises through the absorber 10 and meets the weak solution, which, driven by the level 26, comes from the pipe 24 via a conduit 40 into the upper part of the absorber 10 at 42. When the weak solution flows downwards through the absorber 10, the weak solution absorbs refrigerant vapor flowing upwards during rejection of heat to the surrounding air, the weak solution thereby becoming a rich solution again before it flows down and is collected in the lower part of the absorber below the level 12.

The rising inert gas continues from the absorber 10 to the pipe 36 and flows into the evaporator 32 and permits the refrigerant condensate to vaporize in it.

In order to prevent gaseous medium, which possibly does not condensate in the condenser, from collecting in the condenser and blocking the outflow of refrigerant condensate from the condenser, a vent conduit 44 is arranged between the outlet of the condenser 28 and the conduit 38, which conduit 44 leads the gaseous medium to the absorber 10.

The absorber 10 is made of two substantially rectangular steel plates 52 and 54, respectively, which have been welded together at the periphery 56 and along horizontal parts 58, after which the plates have been "blown out" by a liquid of high pressure, so that a continous meander-shaped duct 59 with horizontal parts 60 and vertical parts 62 is formed between the inlet for inert gas mixed with gaseous refrigerant and the outlet for inert gas. The plates 52 and 54 are roughened on their insides, so that they are more easily wetted by the absorption liquid. Certain roughened portions 64 of the parts 58 have been left unwelded, through which portions the absorption liquid leaks down to ducts below and moves along their walls from top to bottom and absorbs refrigerant, which in gaseous form flows upwards through the duct 59 and is blocked by the absorption liquid, which leaks through the portions 64, to take the short cut through these portions.

The roughening can be constituted by one set of straight and parallel grooves 72 crossing another set of straight and parallel grooves 74 pressed into each of the plates 52 and 54. Parallel grooves are located at a distance S of about 1,6 mm from each other and form an angle $\alpha$ of about 5 degrees with the horizontal. The bottom of the respective groove shows an angle $\beta$ of about 60 degrees and is located at a depth D of about 0,3 mm below the surface 76 of the respective plate. After the grooves have been pressed, the plates are subject to blue annealing, i. e. heated to about 350° C., which treatment improves the wettening of the plates by the liquid. The grooves will by capillary action improve the spreading of the liquid laterally in the absorber. It is to be noted that capillary grooves are known per se in connection with absorbers through U.S. Pat. No. 3,681,938.

It is usual that one collects the absorption liquid in the form of the rich solution in a vessel located below the absorber. Here the rich solution is instead collected in the absorber itself. To make this possible, the pipe 38 is provided with two inlets 66 and 68, respectively, to the absorber. When the heating cartridge 18 is shut off, the pump 16 stops pumping, the level 26 thereby sinking and the level 12 in the absorber rising to the level 70. The inlet 68 is located just above the level 70, so that the circulation of gaseous medium through the absorber can start, when the heating cartridge 18 is switched on again. When the apparatus has become warm and the pump 16 thus is operating normally, the level in the absorber will adjust on the level 12. The inlet 66 is located just above the level 12. The gaseous medium from the conduit 38, which medium is relatively heavy, will now automatically find its way into the absorber through the inlet 66. The arrangement with the two inlets 66 and 68 is already known in this connection through said U.S. Pat. No. 3,782,134.

It would also be possible to use the two plate structure of the absorber according to the invention as evaporator 32, refrigerant condensate then entering the evaporator at a location corresponding to 42 and leaking through openings corresponding to the openings 64 and vaporizing in inert gas flowing in a duct corresponding to the duct 59.

We claim:

1. Absorber for an absorption refrigerating apparatus, said absorber (10) comprising an inlet (42) for a liquid, the liquid flowing downwards through the absorber and absorbing a refrigerant which in gaseous form flows through the absorber, and two joined plates (52 and 54, respectively) which between themselves form a plurality of substantially horizontal ducts (60), arranged above each other, for the refrigerant, wherein the plates on the inside of the absorber are treated in a way which promotes that the inside is wetted by the liquid and the bottom of the ducts have small openings (64, 72, 74), through which the liquid leaks down into the roof of a duct located below and moves downwards along its roof and walls, and said openings are sized such that the liquid substantially blocks passage of the refrigerant through said openings.

2. Absorber according to claim 1, wherein said plates are joined together by welding and said openings, (64, 72, 74) are formed of portions between the plates, which portions have been left unwelded.

3. Absorber according to claim 1 or 2, wherein each plate on its inside is provided with one set of parallel grooves (72) crossing another set of parallel grooves (74).

4. Absorber according to claim 3, wherein said grooves (72, 74) form an angle ($\alpha$) with the horizontal, which angle is between 3 and 12 degrees.

5. Absorber according to claim 4, wherein said angle ($\alpha$) is about 5 degrees.

* * * * *